United States Patent Office 3,484,248
Patented Dec. 16, 1969

3,484,248
ALKALINE CONVERSION OF GREEN TEA
USING HYDROGEN PEROXIDE
Harold Nathaniel Graham, Englewood, and Victor Vernon Studer, Mountain Lakes, N.J., and Martin Gurkin, Bardonia, N.Y., assignors to Thomas J. Lipton, Inc., Englewood Cliffs, N.J., a corporation of Delaware
No Drawing. Filed July 3, 1967, Ser. No. 650,583
Int. Cl. A23f 3/00
U.S. Cl. 99—76                                    10 Claims

ABSTRACT OF THE DISCLOSURE

Green tea is converted to black tea by heating an aqueous solution of green tea solids at a pH above about 7.0 in the presence of hydrogen peroxide.

---

This invention relates to tea and tea extracts and to processes for preparing the same. More particularly, the invention relates to a novel process of converting extracts of tea, such as green tea, to oxidation products thereof, such as black tea.

Green tea, as the term is employed herein includes freshly gathered tea leaves, tea leaves which have been freshly gathered and dried immediately, tea leaves which have been heat-treated before drying to inactivate the enzymes therein, and aqueous extracts of these leaves. In each instance, the green tea has undergone substantially no fermentation to the "black" state.

Black tea, on the other hand, is usually prepared by subjecting freshly picked tea leaves to a series of processing conditions including the withering and rolling of freshly harvested leaves, followed by a fermentation step (enzymic oxidation) during which the characteristic color, flavor and aroma of black tea are developed. The fermentation is stopped after a suitable period of time, the tea leaves are "fired" to inactivate the enzymes causing the fermentation and the tea is dried. The extent of fermentation varies, in commercial practice, from black to various gradations between green and black. Partially fermented teas are known as "oolong" teas. The green, oolong, and black teas each have distinctive flavor and color characteristics.

The fermentation processes are generally carried out at or near the tea growing areas and the fermentation conditions vary with local customs and climatic conditions. As a result, the fermented teas of commerce vary greatly in color and quality of flavor, depending upon the area of the world in which they are produced and the conditions of processing. A means for standardizing or at least insuring the production of a uniform quality of fermented black tea and of partially fermented varieties from a given green tea has long been sought.

It has been proposed to convert green tea to black tea by artificial means and methods, for example, by treating an extract of the green leaf with a catalyst such as potassium permanganate at a temperature as high as about 90° C. for a period of time ranging as long as about six hours, as disclosed in U.S. Patent 2,863,775. As far as we are aware, however, such method has never attained commercial significance.

Another method proposed for converting green tea extracts to black tea involves the use of fresh green tea leaves still containing their natural enzymes by adding such fresh leaves to an aqueous extract of green leaf thereby to convert the latter to black tea. Such procedures are disclosed and claimed in the Seltzer et al. Patent 2,975,057.

It is an object of the present invention to provide a process whereby black and partially converted teas can be prepared from manufactured green tea under closely controlled conditions.

Another object of the invention is to produce teas of varying degrees of color and flavor from green tea extracts.

Another object of the invention is to convert green teas at temperatures higher than those at which normal fermentations can occur.

Still another object of the invention is to effect the conversion of green teas in shorter periods of time and under conditions which produce uniform quality in the final product, even when teas from a variety of sources are used.

Another object of the invention is to produce black tea from green teas which would not normally be suitable for use in standard black tea fermentations because of low enzyme activity or the lack of certain constituents required for standard fermentation.

It is another object of the invention to bring about the conversion of green tea without the use of enzymes which become inactivated by heating.

Still another object of the invention is to develop a process of converting green tea products which readily lends itself to continuous operations.

Another object of the invention is to produce an instant black tea directly from green tea without the necessity of carrying out the additional processing steps (such as firing and drying) required for the manufacture of commercial black tea.

In accordance with the present invention, by which the foregoing objects are realized, the water-soluble constituents of green tea, which may be an aqueous extract of green tea, are heated in the presence of water and hydrogen peroxide at a pH of at least 7.0. Under the conditions prevailing, the reaction between the peroxide and the water-soluble constituents of the green tea is allowed to progress until a desired amount of conversion of green tea to black tea has taken place. It is important to note that the conversion is non-enzymic, that is, it will take place with none of the active natural leaf enzyme present.

Although the pH of the solution is important in obtaining the objectives of the invention, other conditions are also to be considered, such as the temperature, the amount of peroxide in the solution, the time, agitation of the reaction system, and the concentration of the tea solids in the aqueous system. These and other features of the invention will be discussed in the following description.

The following examples illustrate how the invention may be carried out. The percentages expressed are on a weight basis unless otherwise indicated.

EXAMPLE 1

A hot water extract of commercial Japan green tea was prepared containing 4.7% soluble tea solids. The solution, at 60° C. and an initial pH of 5.4, was made alkaline by adding, with agitation, 9.5% potassium hydroxide (tea solids basis) as a 45% solution. This increased the pH of the solution to 8.8. Ten percent hydrogen peroxide (tea solids basis) as a 35% solution was then added to the tea solution with rapid agitation and the temperature rapidly raised until a slow boiling action was evident (about 100° C.). Boiling was continued for 40 minutes. At the end of this period, the pH of the solution had decreased to 6.7. The tea solution was cooled to 60° C. and the pH reduced to 5.5 by the batchwise addition of 350 grams of cation exchange resin (IR 120 H+, 63% $H_2O$). The resin was removed by screening. 2.4% $CaCl_2 \cdot 2H_2O$ (tea solids basis) was then added and the insoluble material removed by centrifuging (at 6,700 times gravity) at 60° F. This is referred to as "dehazing" and is disclosed and claimed in the Schroeder Patent 2,891,866. The overall yield was 97.5% based on the amount of green tea soluble solids before treatment.

This "converted" green tea solution, now the color of a black tea extract at a similar tea solids concentration, was concentrated under vacuum to a solids content of 45%. A quantity of maltodextrins equal to the tea solids present was added and a portion of the material was vacuum drum dried. The resulting product when dissolved in water at beverage strength, had the flavor of black tea and a color similar to a regular tea beverage from a high quality commercial black tea leaf. The solubility of the powder and the clarity of the solution at beverage strength in cold, hard water were excellent.

Portions of the "converted" green tea concentrate containing maltodextrins described above, were mixed at levels of 25, 35 and 50% with 75, 65 and 50%, respectively, of a similar concentrate containing maltodextrins prepared from an extract of black tea leaf. These concentrate mixes were vacuum drum dried to give powders having satisfactory solubility and clarity in cold, hard water and color and flavor similar to a high quality beverage made from commercial black tea. The color and clarity of the blended and unblended products are summarized in Table I.

TABLE I

| Tea Products | Klett color | Clarity index |
| --- | --- | --- |
| 100% converted green | 206 | 10 |
| 50% converted green and 50% commercial black | 228 | 6.5 |
| 35% converted green and 65% commercial black | 231 | 7 |
| 25% converted green and 75% commercial black | 238 | 4.5 |
| 100% commercial black | 247 | 7.5 |

Color was measured in a Klett Colorimeter by preparing a 0.14% solution of instant tea (0.07% tea solids) in a buffer solution (0.944% $NaH_2PO_4 \cdot H_2O$; 0.858% $Na_2HPO_4 \cdot 7H_2O$) at pH 6.4 and at 25° C. A 420 millimicron light filter was used. The instrument is calibrated against a dichromate standard.

Clarity was measured in a 0.7% solution of instant tea (0.35% tea solids), in synthetic hard water, at 13° C., using a Klett Colorimeter with a 660 milimicron light filter. The synthetic hard water contained 0.0179% $CaCl_2 \cdot 2H_2O$, 0.015% $MgSO_4$ and 0.0062% $NaHCO_3$. After the measurement was made, the sample was centrifuged at 2000 times gravity and the absorbance was determined using the same filter. The difference between the two readings in Klett units is the clarity index. In every case the clarity values of solutions made up with soft water are substantially lower (i.e., clearer) than those made with hard water.

EXAMPLE 2

To demonstrate the effect of somewhat smaller amounts of $H_2O_2$, the following method was carried out following generally the procedure described in Example 1. A solution of green tea containing 5.0% tea solids was prepared from a freeze-dried extract of Japan green tea siftings. The solution at 60° C. and an initial pH of 5.2 was made alkaline by adding 10% KOH (to a pH of about 9.0). After 10 minutes at 60° C., eight percent $H_2O_2$ was added and the mixture was heated at 100° C. for 20 minutes. The final pH was recorded. An aliquot was separated and its pH was reduced by the addition of ion exchange resin. The materials were then centrifuged at 60° F. and 7,000 times gravity for 10 minutes. The supernatant liquid was concentrated, mixed with an equal amount of maltodextrins as described in Example 1 and drum-dried. A control was also run to which no KOH and no $H_2O_2$ was added. All of the products produced iced tea beverages with hard water which were clear. The two products obtained by alkaline oxidation had flavor similar to a black tea beverage whereas the flavor of the control product was similar to green tea. The other results are presented in the following table.

TABLE II

| | Control | Without resin addition | With resin addition |
| --- | --- | --- | --- |
| Final pH | 5.4 | 8.3 | 6.3 |
| Yield, percent | 85 | | 83 |
| Color (Klett) | 174 | 380 | 303 |

By comparison with Example 1, the results indicated that increased degrees of color can be developed in the alkaline conversion of green tea with peroxide by decreasing within limits the amount of peroxide used. This effect is believed to be due to the bleaching caused by quantities of peroxide in excess of that required for conversion.

EXAMPLE 3

Various quantities of KOH (45% w./w.) were added to green tea solutions having 5% tea solids, at 60° C., generally as described in Example 1. After about 1–2 minutes, 10% $H_2O_2$ (based on tea solids) was added and the solution was boiled for 45 minutes. In some cases (as indicated below) the pH was adjusted to 5.5 by adding resin, the solutions were dehazed and freeze-dried. The results are presented in the following table.

TABLE III

| Percent KOH added initially | 0.0 | 4.0 | 8.0 | 12.7 |
| --- | --- | --- | --- | --- |
| pH (after KOH) | 5.2 | 7.0 | 8.0 | 9.0 |
| pH after $H_2O_2$ treatment | 4.3 | 5.7 | 6.7 | 8.1 |
| G. resin/g. tea to readjust pH to 5.5 | [1] | [1] | 0.23 | 0.42 |
| Yields (percent) | 85.9 | 96.3 | 98.5 | 94.6 |
| Klett color | 202 | 212 | 257 | 318 |

[1] No resin added.

These data show that a significant color developed at pH between 7.0 and 8.0 and above. At pH of about 7.0 acceptable color was obtained, and no resin adjustment of pH was required.

EXAMPLE 4

To investigate further the effect of varying pH, green tea solutions (5.0% tea solids) containing various quantities of added potassium hydroxide were heated to ca. 60° C. and 10% hydrogen peroxide (tea solids basis) added. The reaction mixtures were boiled for 20 minutes, cooled to 60° C. and adjusted to pH 5.5 with ion-exchange resin. A qualitative test for $H_2O_2$ was made and was negative. The pH adjusted solutions were dehazed and freeze-dried. Results appear in the following table.

TABLE IV

| | $H_2O_2$ level=10% w./w. | | | | | |
| --- | --- | --- | --- | --- | --- | --- |
| Expt. No | 1 | 2 | 3 | 4 | 5 | 6 |
| Percent KOH (added initially) | 0 | 4.5 | 8.5 | 12.5 | 18.5 | 24.5 |
| pH after KOH addition | 5.3 | 7.2 | 8.3 | 9.0 | | |
| pH after $H_2O_2$ treatment | 4.5 | 5.9 | 6.9 | 8.0 | 8.9 | 9.6 |
| Percent resin (to adjust to pH 5.5) | [1] 2.1 | 6.7 | 18.3 | 34.9 | 70.7 | 96.5 |
| Yields (percent) | 87 | 91 | 95 | 100 | 100 | 100 |
| Klett color | 123 | 131 | 177 | 245 | 340 | 305 |

[1] Percent KOH used to increase pH.

Within the range of acceptable colors, the color of the product generally increased with increasing amounts of alkali. A decrease in color occurred at the highest level of KOH addition (24.5% KOH), implying an optimum KOH level for the greatest color conversion. Visually, the converted tea with a color intensity similar to commercial black instant tea (Klett 245) was also similar in hue (redness) to commercial instant tea. At the higher alkali levels the treated green teas were dark, but not red. The products of experiments 4, 5 and 6 were tasted and found to be acceptable instant black tea beverages.

EXAMPLE 5

The effect of varying the amount of $H_2O_2$ was further investigated in the following test. Alkaline solutions of green tea (5.0% tea solids) were prepared containing 8.5% KOH and heated to 60° C. The pH after KOH addition was 8.3. Various quantities of $H_2O_2$ were added and the reaction solutions were boiled for 20 minutes, cooled to 60° C. and adjusted to pH 5.5 with ion-exchange resin. A qualitative test for $H_2O_2$ was made and was negative. The pH adjusted solutions were dehazed and freeze-dried. The oxidized products were tasted and judged to be similar to black tea. The control (no hydrogen peroxide) still tasted like green tea. The results appear in the following table.

TABLE V

| Expt. No | 1 | 2 | 3 | 4 |
|---|---|---|---|---|
| Percent $H_2O_2$ | 0.0 | 5.0 | 10.0 | 15.0 |
| pH (after $H_2O_2$ digestion) | 8.2 | 7.6 | 6.9 | 6.3 |
| Percent resin (to adjust to pH 5.5) | 40.8 | 32.2 | 18.3 | 13.2 |
| Yields (percent) | 89 | 90 | 95 | 98 |
| Klett color | 135 | 177 | 177 | 141 |

All the colors were light as compared to the values obtained with 10% hydrogen peroxide at higher alkali levels (see Example 4). These data indicate that higher levels of alkali are necessary for preferred color development, and that hydrogen peroxide promotes conversion and is necessary to develop desirable black tea taste characteristics. However, as discussed below, the level of alkali required for optimum color development is also dependent on the variety of green tea to be converted to black tea. The lower Klett color which developed in experiment No. 4 again indicated that the large amount of $H_2O_2$ caused some bleaching (see Example 2).

EXAMPLE 6

The effect of varying reaction time was investigated in this example. Green tea solutions (5.0% solids) containing 8.5% KOH and 10% $H_2O_2$ were boiled for 20, 40 and 80 minutes respectively. The qualitative $H_2O_2$ test was negative after 20 minutes. After cooling to 60° C. the alkaline solutions were adjusted to pH 5.5, dehazed and freeze-dried. The results appear in the following table.

TABLE VI.—EFFECT OF VARYING REACTION TIME
[KOH=8.5%, $H_2O_2$=10.0%]

| Expt. No | 1 | 2 | 3 |
|---|---|---|---|
| Reaction time (min.) | 20 | 40 | 80 |
| pH (after $H_2O_2$ digestion) | 6.9 | 6.8 | 6.6 |
| Percent resin (to adjust to pH 5.5) | 18.3 | 24.5 | 24.2 |
| Yields (percent) | 95 | 94 | 94 |
| Klett color | 177 | 194 | 228 |

The final pH of the reaction mixture decreased slightly and color intensity increased with increasing reaction time. The flavor of all of the products was similar to black tea.

The amount of hydrogen peroxide used is dependent on the other condition and variables, particularly the pH, and also the type of green tea used, the concentration of the tea solids, the amount of color development desired, etc. Generally, at least 5% by weight of $H_2O_2$ based on tea solids is used. As pointed out above, excessive amounts of $H_2O_2$ may cause some bleaching of the converted tea.

In producing any product having particularly desired properties, the pH is especially important and, as indicated above should be above about 7.0. Preferred results are obtained above about 8.5. The time of treatment is interdependent with other conditions, such as the type of tea used, the concentration of the tea solids in the solution, and the temperature. The temperature is selected to obtain conversion within feasible times and to obtain the degree of conversion desired. Generally, temperatures within the range of about 50–130° C. are satisfactory. Above 100° C., the system must, of course, be maintained under pressure. Preferred temperatures are in the range of 60–100° C. Higher temperatures or longer times of reaction generally produce a greater degree of conversion to a black tea product. Larger amounts of peroxide (within the limits discussed above) produce more rapid conversion, or conversion at lower temperature or in a shorter time. When the process is carried out using higher concentrations of tea solids, then longer times of conversion, higher temperatures, greater amounts of alkali (or possibly all three conditions) or other conditions discussed herein may be required to effect a desired degree of conversion.

The source of the green tea used as starting material is a factor to consider in selecting the conditions for conversion. One green tea may require a somewhat different combination of pH, pressure, temperature and time, etc. than another green tea. A partially fermented tea, such as an "oolong" tea may be used as a starting material. It is also possible to blend teas from different sources in order to promote uniformity of the product obtained.

If desired, the conversion may be carried out in the presence of green leaf to effect a single stage extraction and conversion to give an infusion of black tea solids. This extract can then be separated from the leaf, neutralized and processed to a black instant tea as described above.

Instead of potassium hydroxide other edible alkalies may be used for increasing the pH for conversion.

The ion exchange resins, as indicated above, are preferred for reducing the pH of the converted tea solution, because they are easily separated from the solution. Electrodialysis techniques, if desired, are also suitable. Other food grade neutralizing agents may be used, such as well-known food grade acids.

We claim:

1. The process of converting green tea to black tea which comprises heating an aqueous solution of solids of said green tea at a pH above about 7.0 in the presence of hydrogen peroxide, and allowing said green tea solution to react with said hydrogen peroxide for a period of time sufficient to oxidize said green tea solids thereby producing black tea.

2. The process of converting constituents of green tea to a black tea which comprises heating said constituents in the presence of water and hydrogen peroxide at a pH above about 7.0, and allowing said constituents to react with said hydrogen peroxide for a period of time sufficient to convert said constituents to constituents of black tea.

3. The process of claim 2 in which the pH is above 8.5.

4. The process of claim 3 in which the temperature is between about 50° C. and 130° C.

5. The process of claim 3 in which the temperature is between about 60° C. and 100° C.

6. The process of claim 3 in which the pH of the converted green tea solution is adjusted to pH below 7.0.

7. The process of claim 2 in which the process is carried out in the presence of tea leaves.

8. The process of claim 1 in which the converted green tea is dried to produce an instant tea.

9. The process of converting constituents of partially fermented tea to a black tea which comprises heating said constituents in the presence of water and hydrogen peroxide at a temperature above about 50° C. and at pH above about 7.0, and allowing said constituents to react with said hydrogen peroxide for a period of time sufficient to convert said constituents to constituents of black tea.

10. The process of converting constituents of green tea to a product equivalent to partially fermented tea, which comprises heating said constituents in the presence of water and hydrogen peroxide at a temperature above about 50° C. and at pH above about 7.0, and allowing said constituents to react with said hydrogen peroxide for a period of time sufficient to convert said constituents to constituents of partially fermented tea.

References Cited

UNITED STATES PATENTS

| | | | |
|---|---|---|---|
| 2,975,057 | 3/1961 | Seltzer et al. | 99—77 |
| 3,163,539 | 12/1964 | Barch | 99—77 |
| 3,369,906 | 2/1968 | Chen | 99—77 |

RAYMOND N. JONES, Primary Examiner

J. R. HOFFMAN, Assistant Examiner

U.S. Cl. X.R.

99—77